United States Patent [19]

Hrovat

[11] Patent Number: 5,309,459
[45] Date of Patent: May 3, 1994

[54] LASER GYRO SMART DIGITAL PLC ACQUISITION CONTROL

[75] Inventor: Albert C. Hrovat, Shoreview, Minn.

[73] Assignee: Honeywell, Inc., Minneapolis, Minn.

[21] Appl. No.: 963,772

[22] Filed: Oct. 20, 1992

[51] Int. Cl.$^5$ ............................................. H01S 3/083
[52] U.S. Cl. ...................................... 372/34; 356/350; 372/38; 372/94
[58] Field of Search .................. 356/349, 350; 372/34, 372/38, 94, 98, 107

[56] References Cited

U.S. PATENT DOCUMENTS

| | | | |
|---|---|---|---|
| 4,267,478 | 5/1981 | Ljung et al. | 356/350 X |
| 4,740,083 | 4/1988 | Curby et al. | 356/350 |
| 4,755,057 | 7/1988 | Curby et al. | 356/350 |
| 4,783,169 | 11/1988 | Matthews et al. | 356/360 |
| 4,899,346 | 2/1990 | Perkins | 356/350 X |
| 5,074,664 | 12/1991 | Mark et al. | 356/350 |
| 5,208,653 | 5/1993 | Mark et al. | 356/350 |

*Primary Examiner*—John D. Lee
*Attorney, Agent, or Firm*—Robert A. Pajak

[57] ABSTRACT

In the present invention, an A/D converter is utilized to feed the relative positions of the gyro mirrors as well as the gyro body temperature to a digital processor. The processor can then calculate the optimum initial position for the gyro mirrors and direct the analog control loop into that position.

2 Claims, 5 Drawing Sheets

ROOM TEMPERATURE START

AFTER TRANSITION TO HOT

HOT TEMPERATURE START

AFTER COOLING DOWN TO ROOM TEMPERATURE

HOT TEMPERATURE START

AFTER COOLING TO EXTREME COLD TEMPERATURE

LASER GYRO SMART DIGITAL PLC ACQUISITION CONTROL

This invention relates to ring laser gyros in general and more particularly to an improved path length control for a ring laser gyro.

BACKGROUND OF THE INVENTION

Ring laser gyros are now well known and are similar to those shown and described in U.S. Pat. No. 3,373,650, issued to Killpatrick, and U.S. Pat. No. 3,390,606, issued to Podgorski. In such ring laser gyros, the ring laser can have moveable mirrors that are traditionally used to control the length of the cavity to an integer number of wavelengths of light. Doing so allows the ring laser beams to be operated at maximum intensity. Previously, a random start-up of the analog control circuits could yield an operating position that might be difficult to maintain over a wide temperature range without running out of mirror transducer authority. That is, the mirror position may only be translationally controlled within the operating limits of the transducer design, generally only several wavelengths of the laser beam light.

For ring laser gyros in general, the path length of a ring laser gyro must be kept constant at an integral number of wavelengths of light for proper gyro operation. Large gyros, however, can mode hop, or change their path lengths by an integral number of wavelengths during a mission without serious degradation in output performance. However, in some laser gyros having a closed-loop optical path length, for example 2.0 inches on a side or leg, the laser beam may extinguish (stop operating) when its transducer mirrors are shifted from one mode to another. Of course, the laser beams operating within a ring laser gyro must not be allowed to extinguish since loss of data will result and navigation errors will be incurred. Therefore, it is desirable that ring laser beams acquire a "mode" at power up, and maintain that same mode (or path length) throughout a mission.

The moveable mirrors on a ring laser gyroscope are traditionally positioned by an analog path length control loop that acts to stabilize the gyro cavity path length to an integer number of wavelengths of the laser light. After initially setting the gyro laser cavity to a length equal to "n" wavelengths, the control loop must then maintain that exact cavity length, although arbitrarily chosen, throughout the mission. Subsequent temperature changes will expand or contract the laser block material of the ring laser gyro control loop is intended to position the mirrors to counteract those material changes which directly affect the closed loop optical path of the ring laser gyro.

In some instances, manufacturers of ring laser gyros are finding it difficult to manufacture a gyro that can maintain a constant path length over a wide temperature range. Specifically, the yield may not be as high as they desire.

However, several methods are being used to increase the yield of gyros that can maintain a constant path length over a wide temperature range. They include (1) extending the range of authority of the transducer mirrors to allow a wider range of movement and (2) thermally stabilizing the gyro block to minimize the material changes thereof, thereby minimizing the required compensation. However, these techniques are generally costly, and also have other undesirable weight and size effects.

SUMMARY OF THE INVENTION

In the present invention, an A/D converter is utilized to feed the relative positions of the gyro mirrors as well as the gyro body temperature to a digital processor. The processor can then calculate the optimum initial position for the gyro mirrors and direct the analog control loop into that position. The result is that the control loops use a minimum of mirror transducer authority during the start-up period and leave the maximum amount of authority left for subsequent temperature compensation.

In the present invention, a computer is employed to calculate the ideal operating point for the gyro path length control (plc) at power up of the laser gyro. Three inputs are used in the calculation, the present PLC position, the present gyro temperature, and a model of the particular gyro's response to temperature.

DETAILED DESCRIPTION OF THE INVENTION

Figure 2:
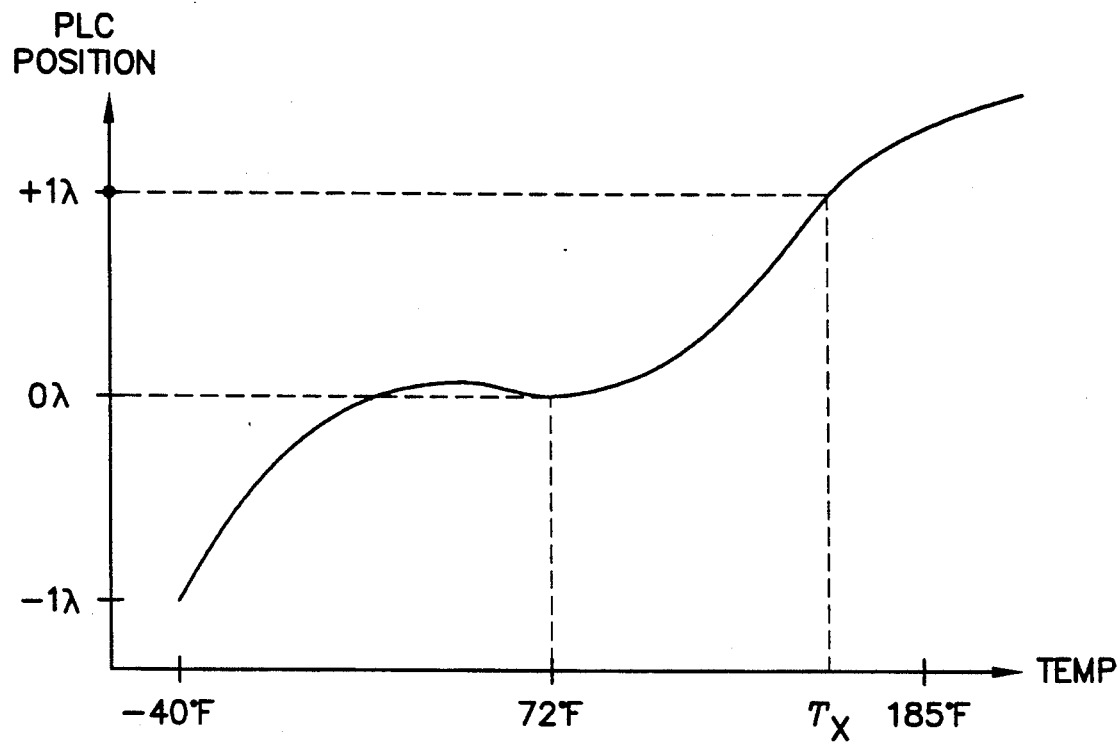
FIG. 2 is illustrates a temperature characteristic for a path length control transducer.

The optimum PLC position is based on a room temperature power up of the gyro. At the factory, gyros are powered on at room temperature and then cycled between hot and cold temperatures. Data taken during the temperature transitions are used to characterize the laser gyro for mirror position vs. temperature. FIG. 2 shows a typical plot of a gyro's PLC mirror position versus temperature in terms of the laser beam wavelength. The object of the invention is to force the PLC control to follow this same curve at every power cycle, rather than allowing it to jump to some parallel but offset curve.

Figure 3A:
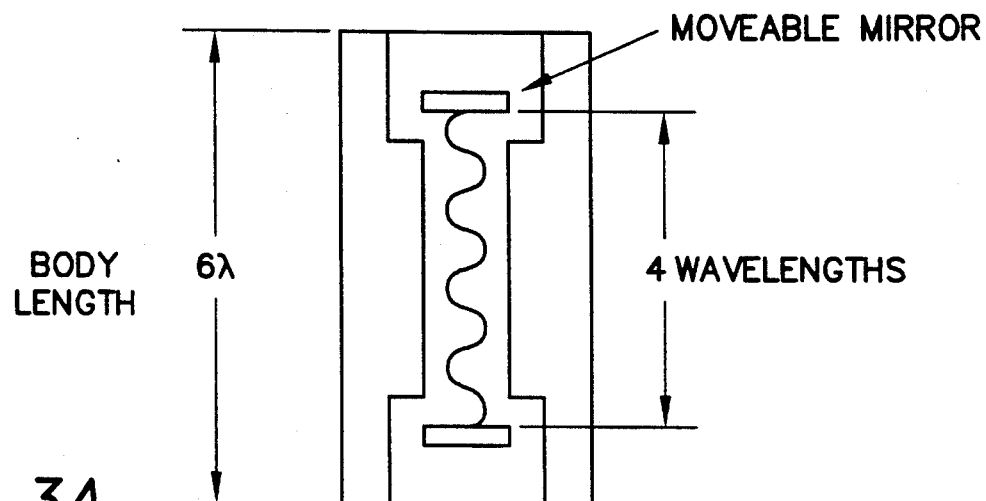
FIGS. 3a and 3b illustrate the behavior of a path length control transducer for a laser beam traveling a single straight line path segment for a change in temperature from room temperature to a raised temperature.

FIGS. 3 and 4 show how the prior art handies both a room temperature and a high temperature power up of a one legged gyro, or more specifically, a laser. (The invention applies to three legged gyro, but a simple one legged gyro was drawn for illustrative purposes). FIG. 3a shows that the prior art always positions the gyro mirrors near the center of their travel at power up. As the laser block or body of gyro (e.g., a low temperature coefficient glass or glass ceramic block) expands or shrinks with temperature, the PLC will move the mirrors in relation to the body in order to maintain the absolute distance between the mirrors at a constant.

Figure 3B:
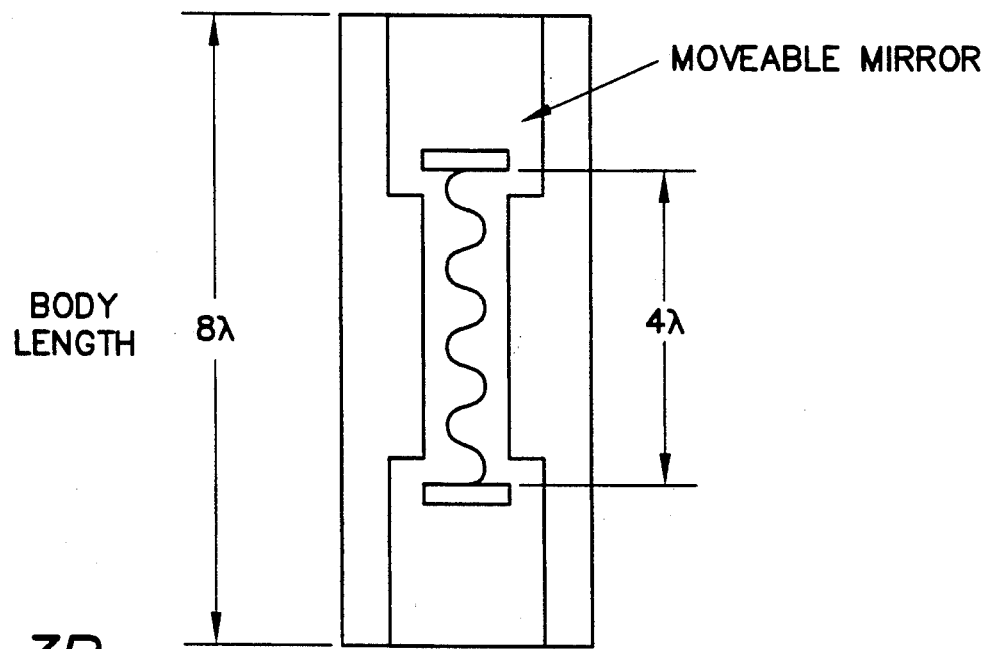

FIG. 3b shows the transition to a "raised" temperature compared with that shown in FIG. 3a. If it is assumed that this example follows the temperature curve in FIG. 2 and that the mirrors can be moved either in or out one full wavelength, then it can be seen that this example could power up at room temperature and operate properly out to either temperature extreme.

Figure 4A:
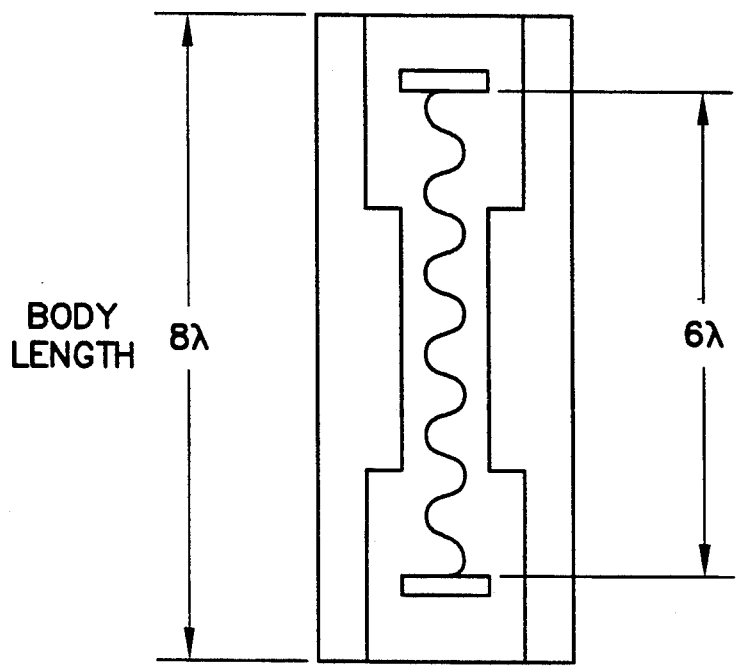
FIGS. 4a and 4b illustrate the behavior of a path length control transducer for a laser beam traveling a single straight line path segment for a change in temperature from a raised temperature to a room temperature.
Figure 4B:
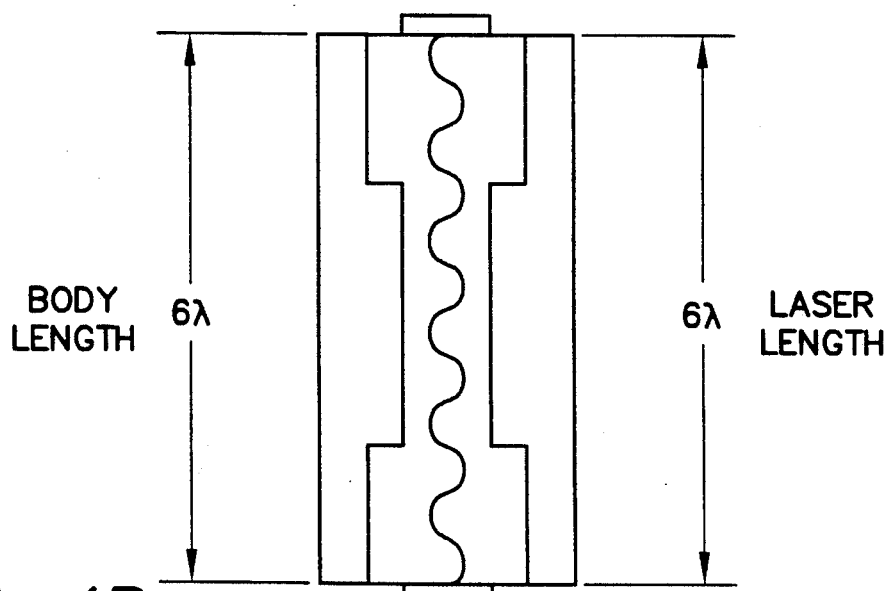

FIGS. 4a-b show the shortcomings of the prior art. If the example gyro were to power up at high temperature— FIG. 4a, its mirrors would reach the limit of their movement at room temperature— FIG. 4b, and hit their stops before getting to the cold end of the curve.

Figure 1:
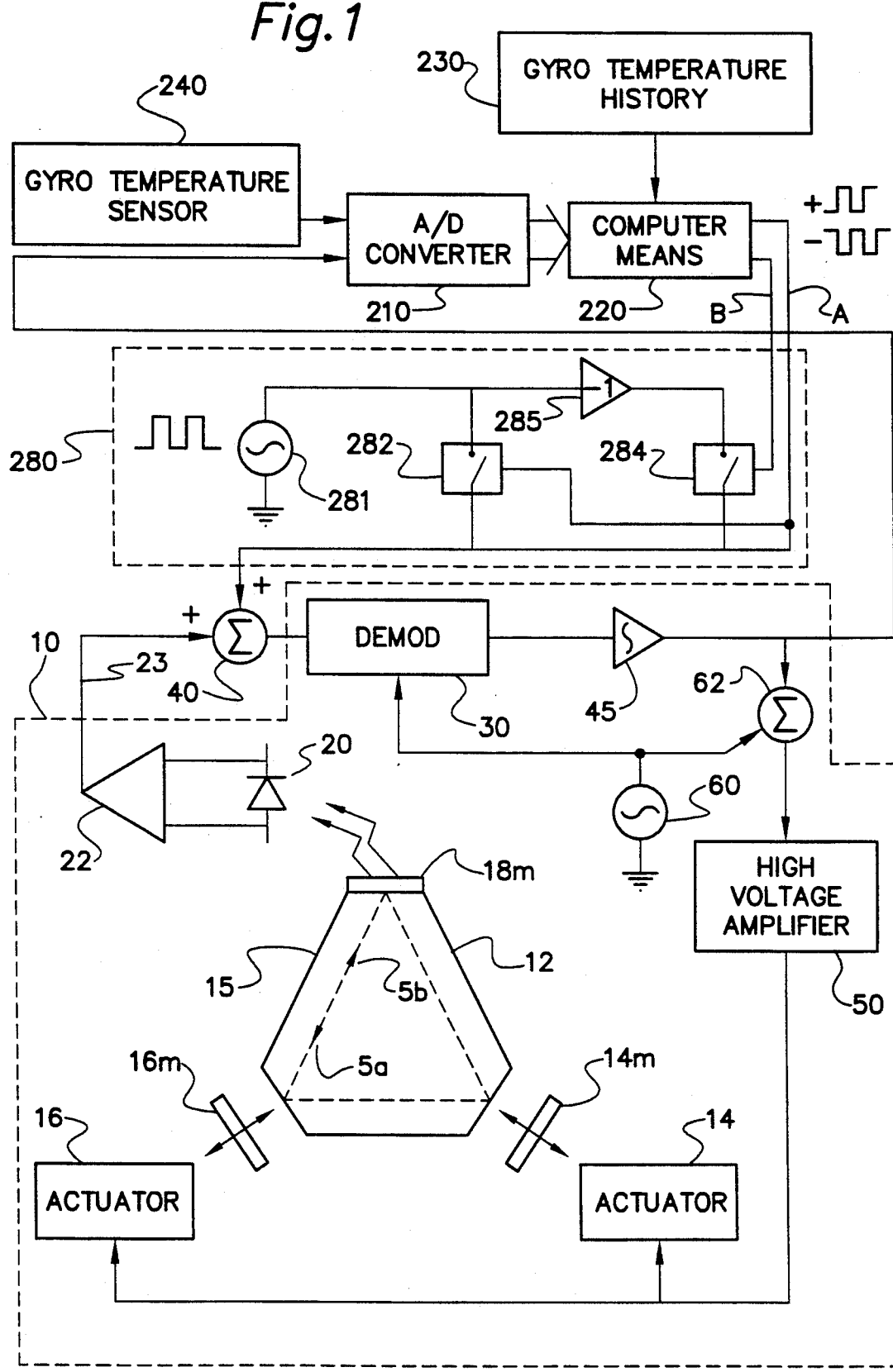
FIG. 1 is a schematic block diagram of a path length control system in accordance with the present invention.

In the present invention, the actual PLC curve of the gyro, like that shown in FIG. 1, is stored and the PLC is preset to match the PLC curve in accordance with the actual start-up temperature of the gyro. A unique curve, as defined by factory testing, is stored for each gyro, allowing individual gyros to have wildly different responses, but still able to take full advantage of the present invention.

The preset itself is accomplished by injecting a measured amount of charge into the PLC integrator from the computer. A digital signal is summed into the feedback signal from the gyro, and synchronized with a demodulator. In this manner, no digital to analog (D/A) converters are needed, and the implementation is kept simple.

FIG. 1 is a block diagram of one embodiment in accordance with the present invention. Illustrated by the block diagram within dashed block 1 0 are a ring laser and a path length control circuit for a ring laser gyro as particularly shown and described in U.S. Pat. No. 4,152,071, issued to Podgorski. Dashed block 10 includes a ring laser gyro 12 including path length control actuators 14 and 16 for affecting the position of ring laser mirrors 14m and 16m, respectively. Ring laser gyro 12 includes a partially transmissive mirror 18m for providing output light representative of the intensity of one of the counter-propagating laser beams of ring laser block 15 travelling in a closed-loop path.

Photodetector 20 provides an output signal to amplifier 22 for providing an electrical signal output 23 representative of the intensity of one of the counter-propagating laser beams 5a or 5b. Output signal 23 is provided as an input to demodulator 30 through a summing means 40. In turn, the output of demodulator 30 is integrated by integrator 45 whose output is amplified by high voltage amplifier 50. The output of high voltage amplifier 50 is presented to actuator 14, and to actuator 16 through inverting amplifier 52.

The path length control circuit within dashed block 10, also includes an oscillator 60 having the output thereof as one input to demodulator 30 and as one input to summing means 62 which sums the output of oscillator 60 and the output of integrator 45. It is well understood, that the oscillator 60 provides a dither signal to provide a closed-loop servo control for maintaining the intensity of one of the laser beams 5a or 5b at maximum intensity, as is well known in the art.

Also shown in FIG. 1 are additional components including an analog-to-digital converter 210, computer 220 and gyro temperature history data block 230. The output of integrator 45 is converted to a digital signal by A/D converter 21 0, which in turn provides one data input to computer 220.

Also included in the circuit of FIG. 1 is a gyro temperature sensor 240 having an output thereof electrically connected to A/D converter 210, which in turn provides a second input into computer 220.

It should be noted that actuators 14 and 16 including mirrors 14m and 16m may be provided by a variety of techniques, similar to that shown and described in U.S. Pat. No. 3,581,227, issued to Podgorski.

The operation of computer 220 will now be described. Computer 220 receives look up table information from gyro temperature history data block 230. Temperature history data is substantially characterized as that illustrated in FIG. 2. That is, the desired path length control position of mirrors 14m and 16m is substantially as illustrated in FIG. 2. For example, at temperature $T_X$, it is intended that the path length control position should be $+\lambda$, (1 wavelength) away from its neutral position. Similarly, at near $-40°$ F., the path length position should be $-\lambda$ away from its neutral position.

A computer 220 responds to information representative of the gyro temperature of the sensor, and information representative of the actual path length control position in order to determine the difference between the actual path length control position and the desired path length control position, and provide the difference thereof. Computer 220 provides output signals A and B which are inputs to switching means 282 and 284, respectively, of signal generating means 280. Signal generating means 280 includes oscillating signal 281 which is provided as one input to switching means 282 and to switching means 284 through inverting amplifier 285. The second output of both switching means 284 and 282 are electrically connected as the second input to summing means 40.

The function of computer means 220 in combination with signal generating means 280 is intended to provide a "preset" condition of the path length control device by injecting a measured amount of charge into the path length control integrator. One method of providing this preset input into the integrator is by applying a 50 millisecond oscillating signal into the input of demodulator 30, either in phase or out of phase in order to effect a $\pm 1\lambda$ path length control position change of mirrors 14m and 16m in total.

For example, consider a situation when the temperature is $T_X$ desiring a path length control of $1\lambda$, and that the actual path length position is $2\lambda$. Computer means 220 is operative to determine that the difference between the actual path length position and the actual path length position for the gyro temperature $T_X$ differs by $1\lambda$ and provides selectively an output signal on signal lines A or B for a period of 50 milliseconds in order to advance the position of the mirrors by an effective path length change of $1\lambda$.

On the other hand if the opposite was true where the difference was $-1\lambda$,, the other of signal lines A and B would be actuated for a period of 50 milliseconds to provide the proper preset to integrator 45 to effect a $-1\lambda$ path length position change.

This process would be repeated periodically, for example, once a second until the optical path length position of mirrors 14m and 16m were within, say for example, $0.5\lambda$, at which time no further preset charge would be applied to the integrator 45, and the path length control would operate in a manner well known in the prior art.

Figure 5A:
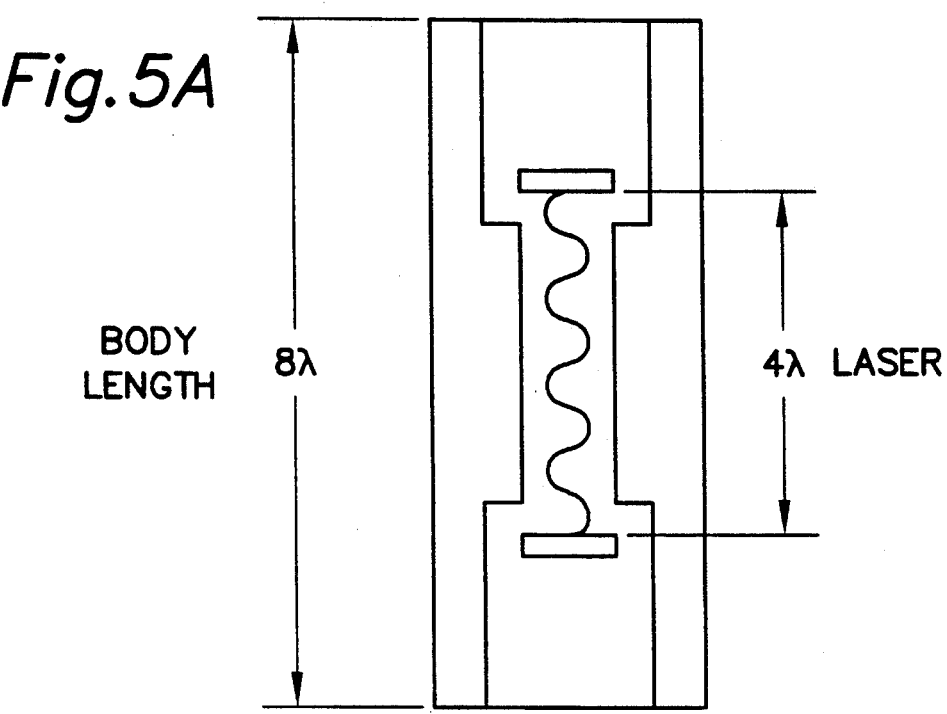
FIGS. 5a and 5b illustrate the behavior of a path length control transducer for a laser beam traveling a single straight line path segment for a change in temperature from a raised temperature to a room temperature when incorporating the path length control system in accordance with the present invention.
Figure 5B:
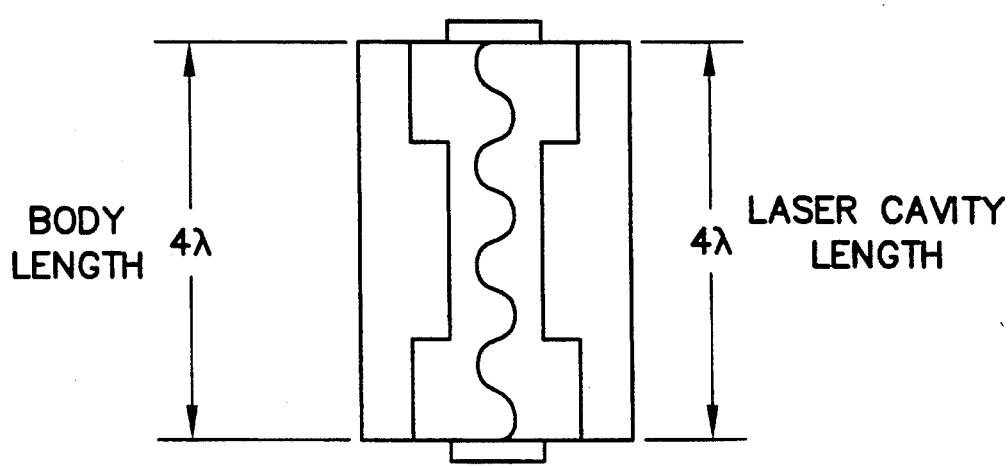

FIGS. 5a-b graphically illustrate how the present invention provides a distinct advantage in the same situation as shown in FIGS. 4a-b. At the time of power up at a high temperature— FIG. 5a, the mirror is "preset" to an extreme position of its travel in anticipation of shrinkage of the laser block or gyro body. By the time the gyro body has reached room temperature— FIG. 5b, and shrunk by one wavelength, the mirror is in its middle position with a full wavelength of travel still available to compensate for additional body shrinkage.

Of course, signal generating means 280 may be incorporated into computer means 220 and has been illustrated in order to enhance understanding of the present invention. More, specifically, computer means may provide an oscillating signal change for a prescribed length of time for achieving the desired preset for integrator 45.

Those skilled in the art will recognize that only a preferred embodiment of the present invention has been disclosed herein and that the embodiments thereof may be altered and modified without departing from the true spirit and scope of the invention as defined in the accompanying Claims.

The embodiments of an invention in which an exclusive property or right is claimed are defined as follows:

1. A ring laser gyro path length control for controlling the position of at lest one mirror of a laser block which forms, at least in part, said ring laser gyro, said control comprising:

a ring laser including a plurality of mirrors for establishing a pair of oppositely traveling laser beams about an optical closed-loop path, wherein at least a first mirror of said plurality of mirrors is coupled to a mirror transducer for controlling the position of said first mirror;

a path length control circuit responsive to at least one of said laser beams for providing a transducer control signal operative for controlling the position of said first mirror to maintain the intensity of said one of said laser beams at a preselected condition;

means for generating data representative of the position of said first mirror;

means for storing data representative of the characteristic of said mirror position as a unction of the temperature of said ring laser, temperature sensing means for providing data representative of the temperature of said ring laser; and computer means for operating on said data representative of the position of said first mirror, said data representative of said temperature of said ring laser, and data characteristic of the desired relative position of said first mirror as a function of the gyro temperature, so as to affect said path length control circuit in a manner to cause the position of said first mirror to approximate said characteristic data at said ring laser temperature.

2. The apparatus of claim 1 wherein:

said path length control circuit includes, demodulator means for operating on the sum of a first signal representative of the intensity of one of said laser beams, and a second signal, integrating means for integrating the output of said demodulator means, and first means for operating on said integrating means output signal and providing said computer said data representative of the position of said first mirror; and said computer means provides said second signal as a function of the difference between said position of said first mirror and the desired position of said first mirror at said ring laser temperature.

* * * * *

UNITED STATES PATENT AND TRADEMARK OFFICE
CERTIFICATE OF CORRECTION

PATENT NO. : 5,309,459
DATED : May 3, 1994
INVENTOR(S) : Albert C. Hrovat

It is certified that error appears in the above-indentified patent and that said Letters Patent is hereby corrected as shown below:

```
     On the title page: Item [73]
             Assignee, cancel "Honeywell, Inc." and
    substitute --Honeywell Inc.--.
Column 5, line 24, cancel "lest" and substitute --least--.
Column 6, line 6, cancel "unction" and insert --function--;
```

Signed and Sealed this

Sixth Day of September, 1994

Attest:

BRUCE LEHMAN

*Attesting Officer*   *Commissioner of Patents and Trademarks*